Mar. 27, 1923.
H. D. CHURCH.
MEANS FOR INDICATING AND CONTROLLING THE LEVEL OF LIQUIDS IN RESERVOIRS.
FILED MAY 3, 1920.
1,449,655.
2 SHEETS—SHEET 1.
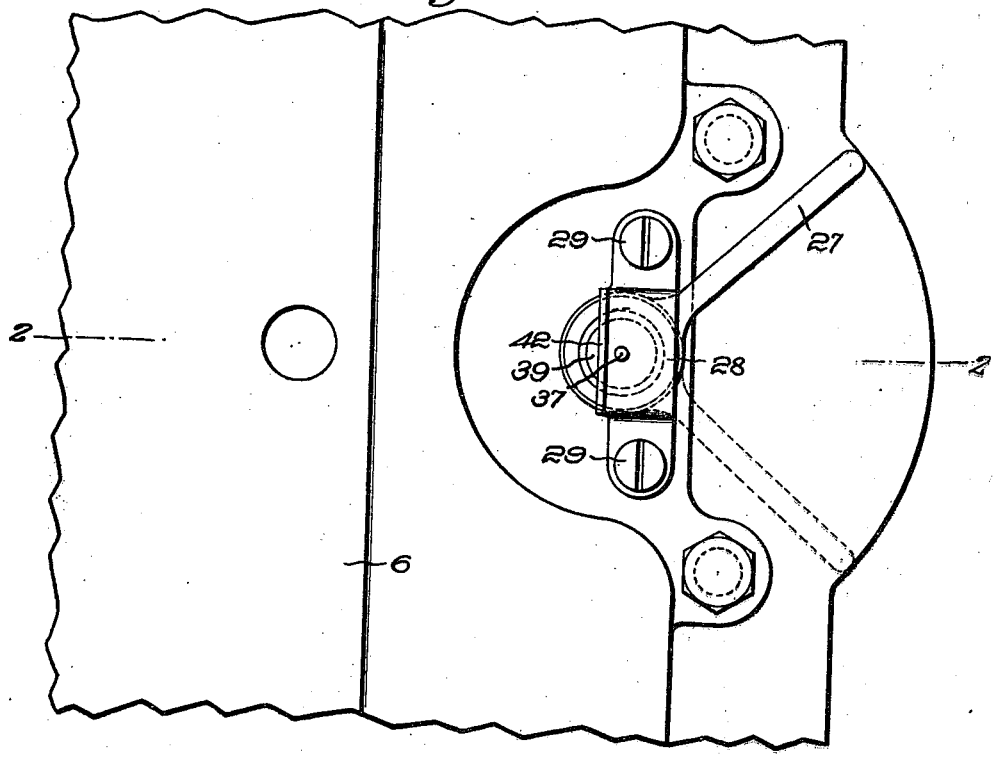
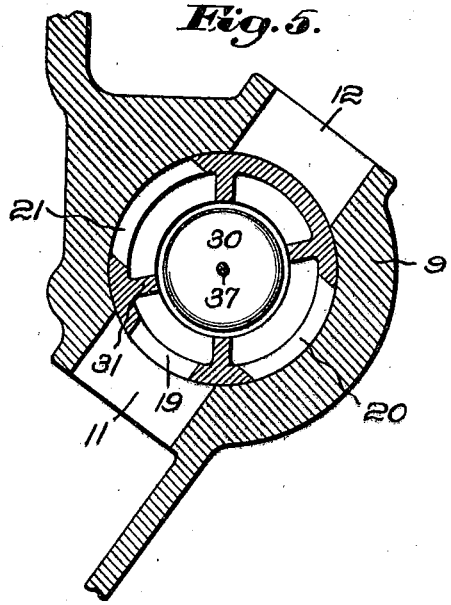
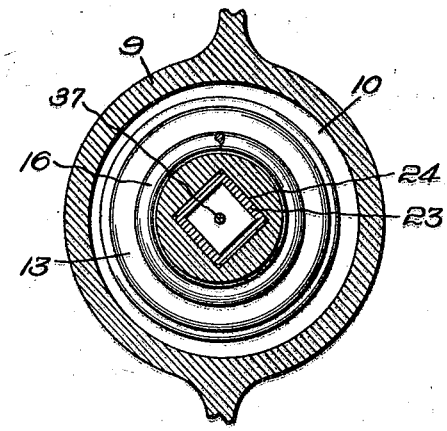
Inventor:
Harold D. Church

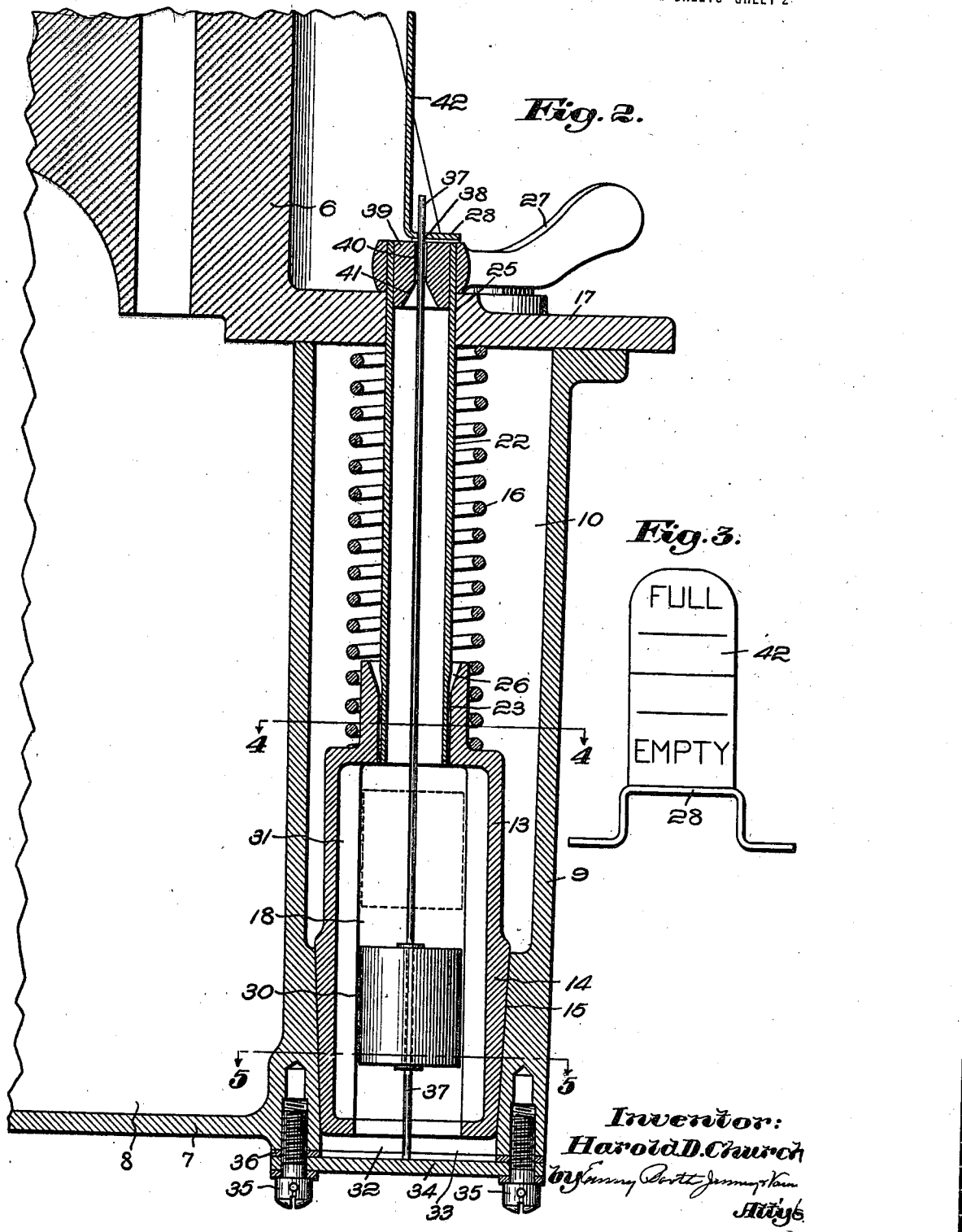

Patented Mar. 27, 1923.

1,449,655

UNITED STATES PATENT OFFICE.

HAROLD D. CHURCH, OF FAIRFIELD, CONNECTICUT, ASSIGNOR TO THE LOCOMOBILE COMPANY, OF BRIDGEPORT, CONNECTICUT, A CORPORATION OF DELAWARE.

MEANS FOR INDICATING AND CONTROLLING THE LEVEL OF LIQUIDS IN RESERVOIRS.

Application filed May 3, 1920. Serial No. 378,604.

*To all whom it may concern:*

Be it known that I, HAROLD D. CHURCH, a citizen of the United States, residing at Fairfield, in the county of Fairfield and State of Connecticut, have invented an Improvement in Means for Indicating and Controlling the Level of Liquids in Reservoirs, of which the following description, in connection with the accompanying drawings, is a specification, like characters on the drawings representing like parts.

This invention relates to means for indicating and controlling the level of liquid in a reservoir such as an oil sump of an internal combustion engine and aims to provide an improved valve for draining the sump and to combine therewith an indicator for indicating the level of the oil in the sump.

My invention will be best understood by reference to the following description when taken in connection with the accompanying drawings of one specific embodiment thereof, while its scope will be more particularly pointed out in the appended claims.

In the drawings:

Fig. 1 is a plan of a portion of an internal combustion engine equipped with an oil drain valve and level indicator exemplifying my invention;

Fig. 2 is a sectional view on line 2—2 of Fig. 1;

Fig. 3 is a side elevation of a part of the oil level indicator;

Fig. 4 is a sectional view on line 4—4 of Fig. 2; and

Fig. 5 is a sectional view on line 5—5 of Fig. 2.

Referring to the drawings and to the embodiment of my invention which I have selected for exemplification, I have shown a portion of the crank-case of an internal combustion engine (see Fig. 2), the same comprising upper and lower parts 6 and 7, the latter commonly called "oil-pan" and providing a reservoir 8 usually termed "sump". It is common practice to provide a sump which serves as a reservoir from which oil is drawn by a pump and is delivered to various working parts of the engine such as crank-shaft, connecting rod and cam-shaft bearings in a manner too well known to require further description. After a certain period of use, it is customary to drain off the oil and refill with a fresh supply. Of course it is important to know how much oil is contained in the sump in order that an adequate supply may be maintained by adding further amounts from time to time. These objects are attained by the provision of a valve and indicator of novel construction which I will now describe.

A valve casing 9, (see Fig. 2) herein formed as an integral part of the oil pan 7, is provided with a vertical chamber 10 in which the valve and indicator are housed at one side of the crank-case at a point convenient for inspection and operation. In case of a motor car, the valve and indicator will be accessible from the interior of the hood which incloses the engine. This being so, the oil can be drained from the sump without the necessity of getting beneath the car as is the case where the drain valve or plug is accessible only from the under side of the engine.

In the present embodiment, the valve casing is provided with an inlet 11 (see Fig. 5) leading from the sump to the interior of the valve casing, and the latter is further provided with an outlet 12 (see Fig. 5) leading from the casing to the exterior. A hollow valve 13 of suitable construction is provided to control the outlet passage 12, and in the present example, said valve has a tapered plug portion 14 received in a correspondingly tapered bore 15 in the valve casing (see Fig. 2). Suitable means, herein a spring 16, is provided to keep the plug firmly seated in the tapered bore, and to prevent leakage which might otherwise occur, said spring being herein seated at its lower end against the valve, and at its upper end against a laterally projecting flange 17 on the lower side of the upper part of the crank-case.

The valve is provided with an interior chamber 18 (see Fig. 2), which is normally and preferably at all times in communication with the sump, and to that end said valve is herein provided with a port 19 (see Fig. 5), which normally affords such communication, and is further provided with a port 20, which in the other extreme position of the valve, as will presently appear, similarly affords such communication. In the normal position of the valve represented in Fig. 5, the latter closes the outlet 12, but, when the valve is turned in a clockwise direction (Fig. 5) through a suitable angular distance, a third port 21 is brought into registration with the passage 12.

The turning movement of the valve is accomplished in the present example by a shaft 22 suitably connected thereto, as by providing said shaft with a square portion 23 (see Fig. 4) received in a correspondingly shaped opening 24 provided in the upper end of the valve. This connection is preferred because it permits the valve and shaft to be assembled readily. Herein, the shaft is mounted in a suitable bearing 25 in the flange 17 (upper portion of Fig. 2), and remains secured to the upper part of the crank-case when the oil pan 7 is removed therefrom in a downward direction. When this operation takes place, the valve simply withdraws from the shaft by a sliding movement in an axial direction. When the parts are to be reassembled, it is necessary merely to see that the square portion of the shaft is in proper registration with the square opening in the valve. To facilitate the entrance of the one part into the other, I have herein provided the valve with a flared entrance 26 (see Fig. 2), so that no difficulty should be had in causing the shaft to enter the valve when the oil pan is applied in an upward direction to the upper part of the crank-case.

The valve shaft is herein provided with a suitable handle 27 shown at the upper portion of Fig. 2 as well as in Fig. 1. The normal position of this handle is represented in full lines in Fig. 1, in which position the valve is closed and no oil can escape from the passage 12. When, however, the handle is swung to the position represented in dotted lines in Fig. 1, the valve is opened to drain the sump. The shaft 22 and handle 27 are normally retained in place, and their turning movement is limited by appropriate means, herein a yoke 28 (see Fig. 1) extending across the top of the shaft, and suitably attached to the flange 17 as by screws 29. By moving the handle in one direction as far as it will go, the valve is fully opened, and by moving it in the opposite direction as far as it will go, the valve is fully closed. By simply removing these screws and lifting the yoke from its place, the shaft and its handle may be withdrawn in an upward direction.

The interior of the valve forms a convenient chamber for a float 30 forming a part of an oil level indicator (see Fig. 2) and the valve is preferably provided with suitable means for guiding the float in its up and down movements, such means herein comprising a plurality of vertical ribs 31 (see Figs. 2 and 5) projecting inwardly from the circumferential wall of the valve. The latter is also provided with an opening 32 in the lower end thereof for the introduction and removal of the float. Preferably also provision is made that this may be accomplished without removing the valve from its place in the valve casing and to this end the latter is herein provided with an opening 33 normally closed by a cover plate 34 suitably secured to the valve casing as by screws 35. A gasket 36 interposed between the cover plate and the valve casing insures a non-leaking joint. By simply removing the cover plate the float is allowed to drop out of its place and thus may be inspected and replaced if necessary without inconvenience.

The height of the oil may be visibly indicated by suitable means herein a rod 37 to which the float is secured at a suitable point preferably such that the indicator shows the sump to be empty when there is still some oil left in it. Therefore in the present example the rod extends some distance below the float and rests upon the cover plate when the indicator registers "empty".

The shaft 22 herein is hollow and through it the rod 37 extends in an upward direction to a point beyond the upper end of the shaft (see Fig. 2) where it passes through an opening 38 provided in the yoke 28. Thus the yoke presents a guide for the rod. The latter may be further guided by a bushing 39 inserted in the upper end of the shaft and provided with an axial opening 40 through which the rod extends. Preferably this opening is provided with a flared entrance 41 much larger in diameter than the rod thereby to guide the latter into its place without difficulty when the parts are being assembled. The advantage of this is obvious when it is considered that the shaft remains attached to the upper part of the crank-case while the float and its rod are carried by the oil-pan, hence, when the latter has been removed and is being replaced, the rod will find its way readily into the opening provided in the bushing at the upper end of the shaft.

The height of the oil may be visibly indicated by comparison of the upper end of the float rod with a fixed element herein a plate 42 (see Fig. 3) which may bear the words "Full" and "Empty" and one or more intermediate lines representing different depths of the oil in the sump. This plate may be and in the present example is formed as an integral part of the yoke 28.

The operation of the device as a whole should be obvious without further description. The level of the oil in the sump is constantly shown by the indicator and oil may be added from time to time in the usual manner to maintain a proper supply. When, after a certain period of use, the oil is to be drained off and replaced by a fresh supply, this may be accomplished by simply lifting the hood of the engine and grasping the handle 27 to turn the valve to its open position. The convenience of this will be readily appreciated. When the valve is open to discharge the oil, the indicator rod will gradually descend until finally its lower end brings up against the cover plate 34. The simplicity and convenience of the entire construction are too obvious to require further comment.

Having thus described one embodiment of my invention, but without limiting myself thereto, what I claim and desire by Letters Patent to secure is:

1. The combination of a valve casing having a port, a hollow valve controlling said port, and liquid level-indicating means comprising a float and means upstanding therefrom within said valve and operated by said float.

2. The combination of a valve casing having a port, a hollow valve controlling said port, and liquid level-indicating means having a float disposed within said valve.

3. The combination of a valve casing having a port, a hollow, vertically-disposed valve controlling said port, and liquid level-indicating means comprising a float and a part operated thereby and reciprocable vertically within said valve.

4. The combination of a valve casing having a port, a hollow, vertically-disposed valve controlling said port, a hollow, vertically-disposed, valve-operating shaft, a float operating vertically within said valve, and a float stem operating vertically within said shaft.

5. The combination of a valve casing having a port, a hollow, vertically-disposed valve controlling said port, a hollow, vertically-disposed, valve operating shaft, a float operating vertically within said valve, a float stem operating vertically within said shaft, and means to guide said float stem.

6. The combination of a valve casing having a port, a hollow, vertically-disposed valve controlling said port, a hollow, vertically-disposed, valve operating shaft, a float operating vertically within said valve, a float stem operating vertically within said shaft, and means carried by said shaft to guide said float stem.

7. The combination of a valve casing having a port, a hollow, vertically-disposed valve controlling said port, a hollow, vertically-disposed, valve operating shaft, a float operating vertically within said valve, a float stem operating vertically within said shaft, and a float stem guide having provision automatically to align said stem therewith when the parts are being assembled.

8. The combination of a valve casing having a port, a hollow, vertically-disposed valve controlling said port, a hollow, vertically-disposed, valve operating shaft, a float operating vertically within said valve, a float stem operating vertically within said shaft, and a float stem guide having a flared entrance automatically to align said stem therewith when the parts are being assembled.

9. The combination of a support, a reservoir detachably supported thereby, a valve casing carried by said reservoir, a valve mounted to turn in said valve casing, and a valve operating shaft interengaging with said valve against relative turning movement and withdrawable from such interengagement by axial movement accompanying detachment of said reservoir from said support.

10. The combination of a support, a reservoir supported thereby, a valve-casing carried by said reservoir, a valve mounted to turn in said valve-casing, and a valve-operating shaft supported by and depending from said support and interengaging with said valve against relative turning movement, said reservoir and valve-casing being separable in a downward direction from said support and said valve being separable from said shaft by movement in the direction of the axis of said valve and shaft.

11. The combination of a case comprising upper and lower parts, the latter carrying a valve-casing, a valve housed in said valve-casing and controlling the discharge of oil from said case, a valve-operating shaft supported by and depending from said upper part and interengaging with said valve against relative turning movement, said lower part and valve casing being separable in a downward direction from said upper part, and said valve being separable from said shaft by movement in the direction of the axis of said valve and shaft.

12. The combination of a case comprising upper and lower parts, the latter carrying a valve-casing, a valve housed in said valve-casing and controlling the discharge of oil from said case, a spring seated at one end against said valve and at its other end against said upper part, a valve-operating shaft supported by and depending from said upper part and interengaging with said valve against relative turning movement, said lower part and valve-casing being separable in a downward direction from said upper part, and said valve being separable from said shaft by movement in the direction of the axis of said valve and shaft.

13. The combination of a valve casing, a support above and to which said valve casing is secured, a valve mounted to turn in said valve casing, a valve-operating shaft supported by and depending from said support and interengaging with said valve against relative turning movement, said valve casing being separable in a downward direction from said support and said valve being separable from said shaft by movement in the direction of the axis of said valve and shaft, and a yoke extending across the upper end of said shaft.

14. The combination of a valve casing, a support above and to which said valve casing is secured, a valve mounted to turn in said valve casing, a valve-operating shaft supported by and depending from said support and interengaging with said valve against relative turning movement, said valve casing being separable in a downward direction from said support and said valve being separable from said shaft by movement in the direction of the axis of said valve and shaft, a float having a stem extending upward through said shaft, and a yoke extending across the upper end of said shaft and presenting a guide for said stem.

15. The combination of a valve casing, a support above and to which said valve casing is secured, a valve mounted to turn in said valve casing, a valve-operating shaft supported by and depending from said support and interengaging with said valve against relative turning movement, said valve casing being separable in a downward direction from said support and said valve being separable from said shaft by movement in the direction of the axis of said valve and shaft, a float having a stem extending upward through said shaft, and a yoke extending across the upper end of said shaft and provided with means cooperating with said stem to indicate the position of said float.

In testimony whereof, I have signed my name to this specification.

HAROLD D. CHURCH.